No. 731,955. PATENTED JUNE 23, 1903.
J. G. ROOT & J. C. WESTERVELT.
APPARATUS FOR DISPOSING OF WASTE FROM BALING PRESSES.
APPLICATION FILED MAY 8, 1902.
NO MODEL. 2 SHEETS—SHEET 1.
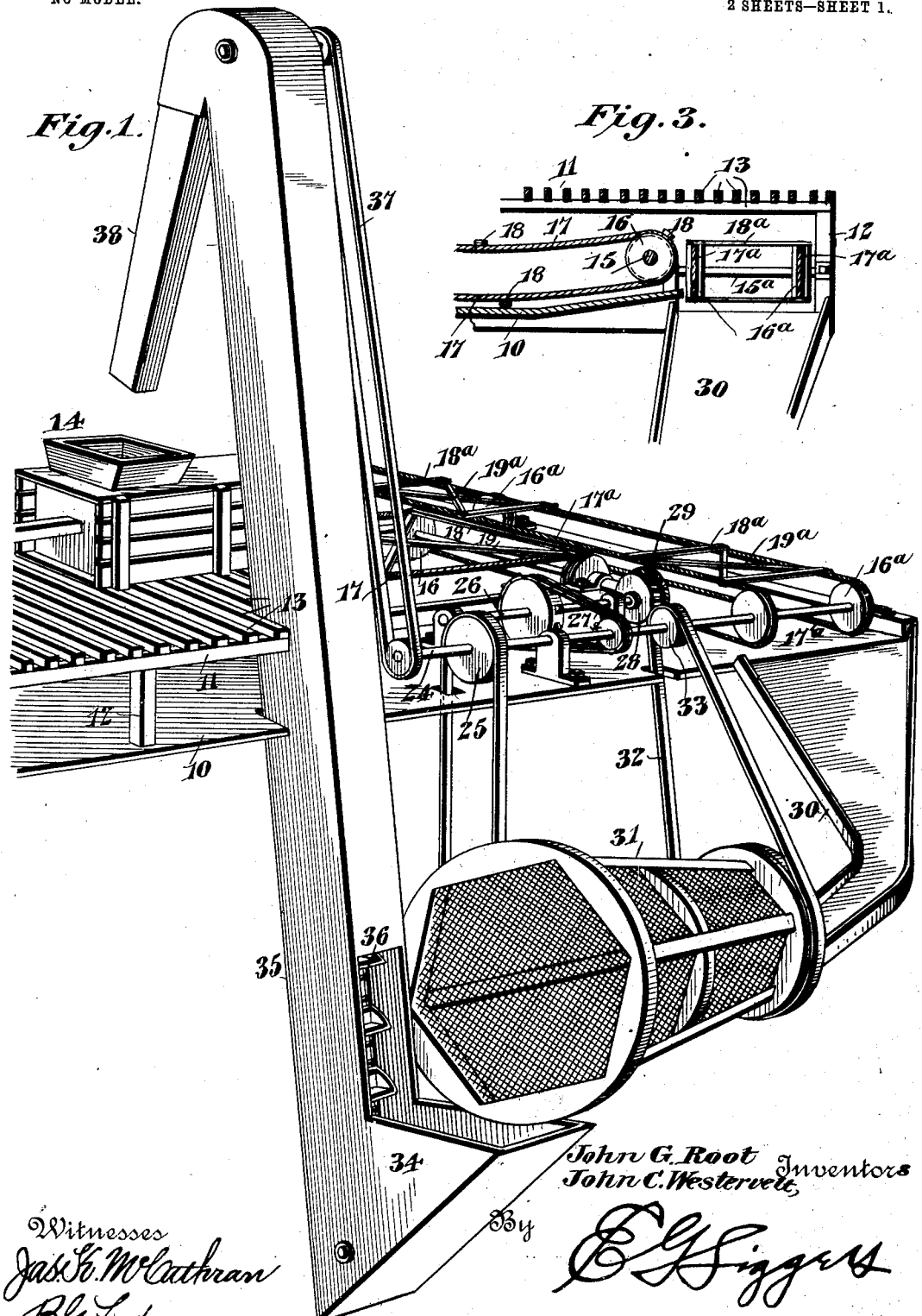

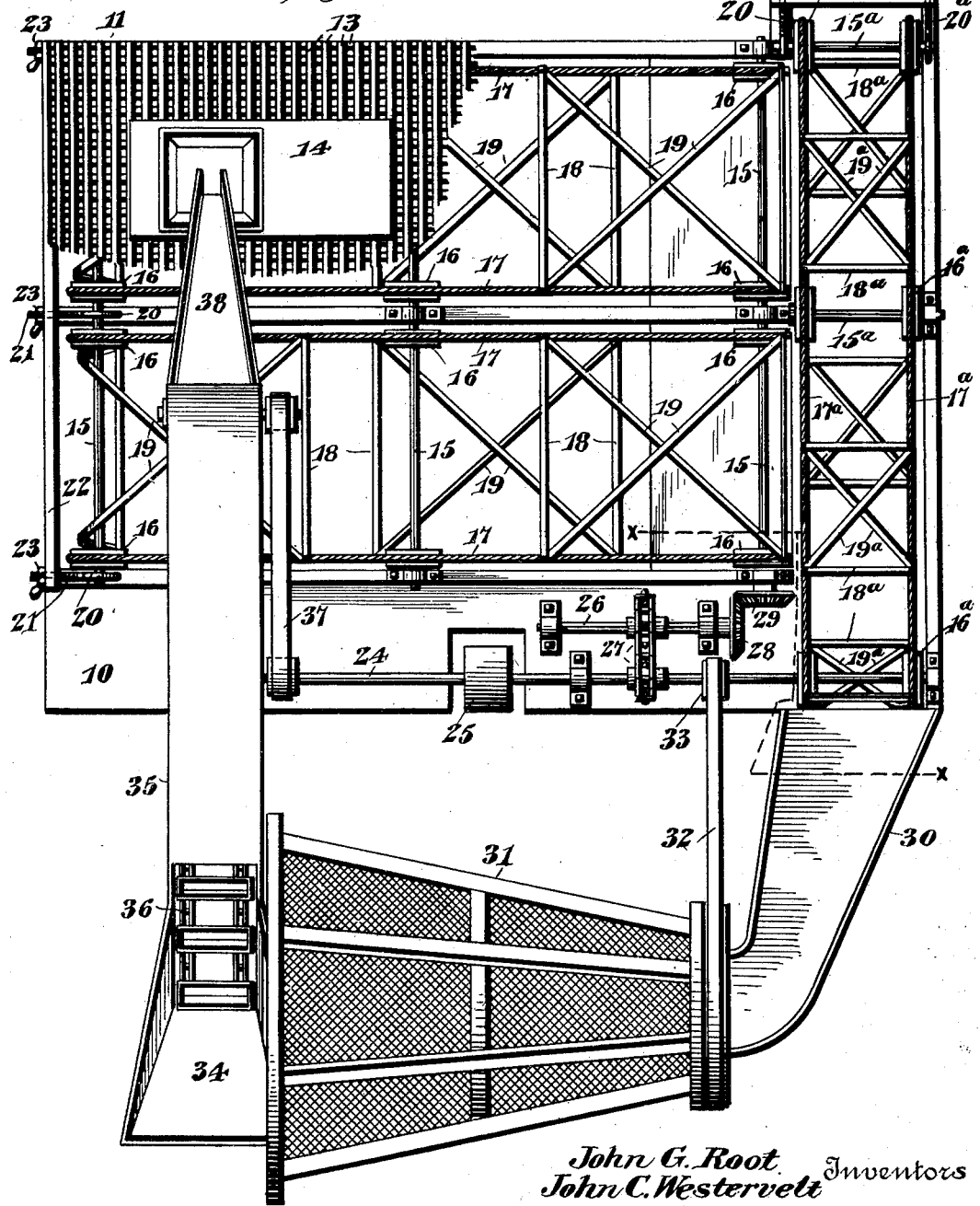

No. 731,955.

Patented June 23, 1903.

UNITED STATES PATENT OFFICE.

JOHN GUY ROOT AND JOHN CHASE WESTERVELT, OF SHELBYVILLE, ILLINOIS.

APPARATUS FOR DISPOSING OF WASTE FROM BALING-PRESSES.

SPECIFICATION forming part of Letters Patent No. 731,955, dated June 23, 1903.

Application filed May 8, 1902. Serial No. 106,495. (No model.)

*To all whom it may concern:*

Be it known that we, JOHN GUY ROOT and JOHN CHASE WESTERVELT, citizens of the United States, residing at Shelbyville, in the county of Shelby and State of Illinois, have invented a new and useful Apparatus for Disposing of Refuse from Baling-Presses, of which the following is a specification.

In baling different kinds of material, especially hay, there is always a great deal of refuse, formed of chaff, seed, and small particles, which accumulates about the press and over the floor. This refuse is continually in the way of the operators and must be constantly cleared out. Furthermore, it contains much valuable matter, which has heretofore been wasted.

The primary object of the invention is to provide means which will automatically dispose of this refuse by removing it from the region about the press, thereby preventing its accumulation and interference with the pressmen.

Another object is to provide means for separating the seed from the chaff and other residue thus taken; and still another object is to provide mechanism for returning said residue to the press, where it is mixed and baled with the hay or other material. As this apparatus is continuously operated in connection with the pressing mechanism, it will be evident that each bale will contain its just and due proportion of chaff, that there will be no waste or interference with the baling operations due to accumulation, and that a valuable product in the form of seed will be saved.

An embodiment of this invention which has proven in actual practice to satisfactorily accomplish the above-mentioned objects is illustrated in the accompanying drawings and described in the following specification; but it will be evident upon an inspection of the claims hereto appended that the invention is not limited to the construction shown and described, but is open to various changes and modifications, and, in fact, certain portions of the apparatus may be eliminated entirely.

In the drawings, Figure 1 is a perspective view of the improved apparatus, certain portions thereof being broken away. Fig. 2 is a top plan view of the same. Fig. 3 is a detail vertical sectional view taken on the line X X of Fig. 2.

Similar numerals of reference designate corresponding parts in all the figures of the drawings.

In the present embodiment of the invention two floors are employed, a lower imperforate floor 10 and an upper perforate floor 11, supported above said imperforate floor by means of suitable standards, as 12. This upper floor may be termed the "pressing-floor" and comprises a plurality of cross-slats 13, spaced a suitable distance apart to provide openings which will permit the passage of chaff and other small particles. Upon this floor is arranged a press, which is indicated generally at 14. This press, it will be understood, may be of any desired make and in itself forms no part of the present invention except so far as it relates to the general combination expressed in the various claims. The lower imperforate floor 10 may be designated the "refuse-receiving" floor, as the refuse which passes through the upper floor 11 will be deposited thereon. Over this floor are arranged endless conveyers, which are preferably constructed in the following manner: Shafts 15 are journaled at suitable intervals between the upper and lower floors, and said shafts carry pulleys 16, over which pass endless cables or belts 17. These belts are connected by scraper-bars 18, which pass over the upper face of the refuse-receiving floor 10, as clearly indicated in Figs. 1 and 3. In order that the belts of the conveyers may be moved equally, evener-straps 19 extend diagonally across the spaces between the belts and the scraper-bars, being connected to both, as shown. In the illustrated structure two of these conveyers are provided, though it will be evident that more or less may be employed, as desired. The rear shaft 15 is journaled in movable boxes 20, which are provided with screw-threaded shanks 21, that extend through an end beam 22, adjusting-nuts 23 being threaded upon the projecting ends. This constitutes a simple belt-tightener, by means of which the conveyers may be tightened as desired.

At the discharge ends of the conveyers above described is arranged a transverse receiving-conveyer, said conveyer also comprising endless belts or cables 17ª, passing about pulleys 16ª, secured to suitable shafts 15ª, that are journaled in bearings arranged above the imperforate floor. The rear shaft of this conveyer is provided with suitable movable journals 20ª, similar to those already described. Scraper-arms 18ª connect the belts or cables, and diagonally-disposed evener-straps 19ª are likewise employed. This transverse conveyer is designed to receive the material from the other conveyers, and said conveyers are much broader than the same. Means are therefore provided for driving this transverse conveyer at a higher speed than said broad conveyers. To this end a driving-shaft 24 is journaled along one side of the floors, said shaft having a pulley 25, around which is passed a driving-belt connected to any suitable power, though preferably the same power that is employed in operating the press. One end of this driving-shaft constitutes one of the shafts for the transverse conveyer, as clearly illustrated in Fig. 2. A stub-shaft 26 is arranged alongside of the driving-shaft and is connected thereto by any suitable gearing—as, for instance, sprocket wheels and chains 27. This stub-shaft carries at one end a bevel-gear 28, meshing with a similar gear 29, that is secured to one of the shafts 15 of the broad conveyer. The gear connection 27 is such that the stub-shaft 26, and consequently the conveyer-shafts 15, will be operated at a considerable less speed than the conveyer-shaft 15ª.

From the discharge end of the transverse conveyer an inclined chute 30 leads to seed-separating mechanism. This mechanism in the present instance is shown in the form of a revoluble screen or bolter 31, driven by a belt 32, which passes around a small pulley 33 upon the driving-shaft 24. The screen tapers toward its receiving end, and the lower or discharge end of the chute 30 is offset and inserted in said receiving end. At the discharge end of the screen or bolter is located a hopper 34, and an endless flight-elevator leads from the bottom of said hopper to a point above the press. This elevator comprises a casing 35, within which is arranged an endless bucket-conveyer 36, driven by a belt 37, which is connected to the driving-shaft. The upper end of the elevator carries a depending inclined delivery-spout 38, the lower end of which is arranged over the feed-opening of the press.

It is believed that the operation of the apparatus may now be readily understood. As already described, it is preferably driven simultaneously with the press. Therefore the chaff and other refuse which drop from the hay or other material being pressed will pass through the pressing-floor and onto the refuse-receiving floor. The scraper-arms operating over said floor will carry this refuse to the transverse conveyer, which in turn will transfer it to the chute. It will gravitate down this chute into the screen or bolter, where the seed and chaff will be roughly separated. This seed may afterward be passed through a fanning-mill or other apparatus for thoroughly cleansing it. The material, however, which passes from the discharge end of the screen or bolter will drop into the hopper and be elevated to the discharge-spout, from whence it will gravitate into the press-box and be baled with the hay.

The first and great important advantage of this mechanism is the automatic removal of the refuse from about the press. The second is the saving of the valuable seed, which, so far as we are aware, has heretofore been lost. The third is the return of the chaff into the press, where it is baled with the hay or other material. As a result all waste is prevented, each bale has only its proportionate amount of chaff, and there is no accumulation to interfere with the free movement of the workmen.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described our invention, what we claim as new, and desire to secure by Letters Patent, is—

1. The combination with a perforate pressing-floor, of pressing mechanism located above the floor, and a conveyer located beneath the floor and arranged to carry off the residue that drops therefrom.

2. The combination with pressing mechanism, of a refuse-conveyer located beneath said pressing mechanism and arranged to carry off the residue that drops therethrough.

3. The combination with a lower imperforate refuse-receiving floor, of an upper pressing-floor that is perforate, said pressing-floor being located above the refuse-receiving floor, a press arranged upon the pressing-floor and a conveyer movable over the lower floor to remove the residue that drops thereon.

4. The combination with a lower imperforate refuse-receiving floor, of an upper pressing-floor that is perforate, said pressing-floor being located above the refuse-receiving floor, a press arranged upon the pressing-floor, and an endless conveyer movable over the lower floor for removing therefrom the residue that drops thereon.

5. The combination with a lower imperforate refuse-receiving floor, of an upper pressing-floor that is perforate, a press arranged on the pressing-floor, and a conveyer comprising spaced endless belts carrying scraper-bars that are movable over said lower floor and remove the material that falls thereon.

6. The combination with a lower imperforate refuse-receiving floor, of an upper perforate pressing-floor, a press arranged upon the pressing-floor, an endless conveyer comprising spaced endless belts carrying scraper-bars that are movable over said lower floor, and diagonally-disposed evener-straps connecting the belts.

7. The combination with a lower refuse-receiving floor, of an upper pressing-floor that is perforate, a press located on the floor, and a conveyer arranged between the floors, said conveyer comprising spaced endless belts carrying scraper-bars that are movable over the lower floor, and evener-straps extending diagonally across the space between the scraper-bars and connected to said bars.

8. The combination with an upper perforate pressing-floor, of a press arranged on the floor, a lower refuse-receiving floor located beneath the pressing-floor, and separate conveyers movable over the refuse-receiving floor for removing the material that falls through the perforate floor.

9. The combination with an upper perforate pressing-floor, of a press arranged on the floor, a lower refuse-receiving floor arranged beneath the pressing-floor, shafts journaled between the floors, and separate conveyer-belts passing over the shafts.

10. The combination with a pressing-floor, of a press arranged on the floor, seed-separating mechanism, and means for conveying the refuse from said pressing-floor to the seed-separating mechanism.

11. The combination with a perforate pressing-floor, of a press arranged on the floor, seed-separating mechanism, and means for conveying the refuse that passes through said pressing-floor to the seed-separating mechanism, said means including a conveyer located beneath the pressing-floor.

12. The combination with a pressing-floor, of a press located over the floor, a rotary screen or bolter, and means for conveying the refuse from said floor to the screen or bolter.

13. The combination with a perforate pressing-floor, of a press located on the floor, a rotary screen or bolter, and means for conveying the refuse that drops through said floor to the screen or bolter, said means including an endless conveyer movable beneath the perforate pressing-floor.

14. The combination with a perforate pressing-floor, of a press arranged on the floor, a rotary screen or bolter, and means for conveying the refuse from said floor to the screen or bolter, said means including a conveyer movable beneath the perforate pressing-floor, and a receiving-conveyer arranged in angular relation to the first-mentioned conveyer.

15. The combination with a perforate pressing-floor, of a press arranged on the floor, a rotary screen or bolter and means for conveying the refuse from said floor to the screen or bolter, said means including a conveyer movable beneath the perforate pressing-floor, a receiving-conveyer arranged in angular relation to the first-mentioned conveyer, and a chute leading from the latter conveyer to the receiving end of the screen or bolter.

16. The combination with a perforate pressing-floor, of a broad endless conveyer movable beneath the pressing-floor, a narrow receiving-conveyer located at the discharge end of the broad conveyer, means for operating the narrow conveyer at a higher speed than the broad conveyer, and seed-separating mechanism arranged to receive the material from the narrow conveyer.

17. The combination with a perforate pressing-floor, of a broad endless conveyer movable beneath the pressing-floor, a narrow receiving-conveyer located at the discharge end of the broad conveyer, a driving-shaft having a connection with the narrow conveyer to operate the same, a gear connection between the driving-shaft and the broad conveyer to operate the same at less speed than the narrow conveyer, and seed-separating mechanism arranged to receive the material from the narrow conveyer.

18. The combination with a press, of seed-separating mechanism, means for conveying the refuse from the press to the seed-separating mechanism, and means for redelivering the residue from the seed-separating mechanism back to the press.

19. The combination with a pressing-floor, of a press arranged over the floor, seed-separating mechanism, means for conveying the refuse from the pressing-floor to the seed-separating mechanism, and means for delivering the residue from the seed-separating mechanism back to a point above the pressing-floor.

20. The combination with a perforate pressing-floor, of a press located upon the floor, seed-separating mechanism, means for conveying the refuse from the floor to the separating mechanism, said means including a conveyer operating beneath the perforate floor, and means for conveying the residue from the seed-separating mechanism to the press.

21. The combination with a perforate pressing-floor, of a press located upon the floor, seed-separating mechanism, means for conveying the refuse from the floor to the separating mechanism, said means including a conveyer operating beneath the perforate floor, and a conveyer leading from the residue-discharge of the separating mechanism to the press.

22. The combination with a perforate pressing-floor, of a press located upon the floor, a screen or bolter, conveying mechanism extending from beneath the pressing-floor to the screen or bolter, and a conveyer leading from the discharge of the screen or bolter to the press.

23. The combination with a perforate pressing-floor, of a press located upon the floor, a rotary screen or bolter located at one side of the floor, conveying mechanism extending beneath the pressing-floor to the screen or bolter, and an elevator leading from the discharge end of the screen or bolter to the press.

24. The combination with a perforate pressing-floor, of a press located upon the floor, a rotary screen or bolter, conveying mechanism extending from beneath the pressing-floor to the screen or bolter, said mechanism including an endless conveyer operating beneath the floor, a receiving-conveyer located beneath and in angular relation to the end of said first-mentioned conveyer, and an inclined chute extending from the discharge end of the receiving-conveyer to the inlet end of the screen or bolter, a hopper located at the discharge end of the screen or bolter, and an endless flight-elevator extending from the hopper to a point above the press.

In testimony that we claim the foregoing as our own we have hereto affixed our signatures in the presence of two witnesses.

JOHN GUY ROOT.
JOHN CHASE WESTERVELT.

Witnesses:
CHAS. H. BEETLE,
H. M. MARTIN.